United States Patent [19]

Hill et al.

[11] 4,113,825
[45] Sep. 12, 1978

[54] METHOD OF SEALING THE ENDS OF AN ELASTOMERIC ROLL

[75] Inventors: Robert W. Hill, Sussex; William G. Onnen, Newton; Lyle C. Ryder, Rockaway, all of N.J.

[73] Assignee: Ames Rubber Corporation, Hamburg, N.J.

[21] Appl. No.: 719,696

[22] Filed: Sep. 12, 1976

Related U.S. Application Data

[63] Continuation of Ser. No. 591,720, Jun. 30, 1975, abandoned.

[51] Int. Cl.² .................. B29D 3/02; B29G 7/00
[52] U.S. Cl. .................. 264/262; 264/263; 264/266; 264/267; 264/314; 264/328
[58] Field of Search .......... 264/266, 267, 262, 328, 264/261, 259, 313, 314, 263; 29/129.5, 130, 132

[56] References Cited

U.S. PATENT DOCUMENTS

| | | | |
|---|---|---|---|
| 3,258,384 | 6/1966 | Scott | 156/423 |
| 3,435,500 | 4/1969 | Aser et al. | 29/130 |
| 3,613,168 | 10/1971 | Rowland et al. | 425/128 |
| 3,941,635 | 3/1976 | Tavelle et al. | 156/86 |

*Primary Examiner*—Willard E. Hoag
*Attorney, Agent, or Firm*—Hopgood, Calimafde, Kalil, Blaustein & Liberman

[57] ABSTRACT

In a fuser roll for electrostatic copying machines comprising a cylindrical metal core surrounded by a cylindrical body of elastomeric material having an outside cylindrical sleeve of protective material, the end surfaces of the elastomeric material are protected from the deleterious effects of silicone fluid by sealing rings of elastomeric material such as fluorosilicone which is resistant thereto. The rings, which are rectangular in cross section and are made of uncured, deformable material, are inserted in the ends of the sleeve with the ends of the sleeve protruding. The sleeve is assembled with the metal core and placed in a cylindrical mold. Silicone rubber is injected into the space between the core and the sleeve and the sleeve and rings are expanded into contact with the mold wall. The roll is then cured. In the finished cured rolls, the rings are bonded to the end surfaces of the silicone rubber body, and to the metal core, and to the interior cylindrical surfaces of the sleeve over an area of substantial width.

6 Claims, 8 Drawing Figures

METHOD OF SEALING THE ENDS OF AN ELASTOMERIC ROLL

This is a continuation of application Ser. No. 591,720, filed June 30, 1975 and now abandoned.

This invention relates to a method of sealing the ends of elastomeric rolls having a metal core and an outside tubular protective sleeve, and to rolls produced by said method.

Such rolls have a variety of uses in various types of apparatus. One important use is in electrostatic copying machines in which such rolls are used to feed copy paper to and through the stage where the electrically charged particles are fused to the paper at relatively high temperatures and at relatively high pressures. For this particular use the performance requirements are very high. The rolls must conform to close tolerances dimensionally, they must be stable dimensionally, the elastomeric body must be heat resistant and of a predetermined hardness and the protective sleeve must be not only heat and abrasion resistant, but also it must remain bonded securely to the elastomeric body during and after repeated flexings over prolonged periods of use.

Heretofore, it has been known to use solid polymers of tetrafluoroethylene obtainable commercially under the trademark or trade name "TEFLON" as the meterial from which the tubular protective sleeves have been fabricated. Silicone rubber has commonly been used as the elastomeric material. According to a known method of making such rolls as described in U.S. Pat. No. 3,435,500 a cylindrical body of elastomeric material is molded onto the metal core and cured thereon. Thereafter a sleeve of heat shrinkable "TEFLON" of a diameter slightly larger than the prescribed final outside diameter of the elastomeric body is placed over the elastomeric body with adhesive and is then subjected to heat. The heat applied causes the sleeve material to shrink and thereby become securely bonded to the elastomeric material. One difficulty with this method is that it is difficult to maintain dimensional tolerances in the finished rolls. Moreover, the bond between the sleeve and the elastomeric material tends to become loosened or cracked by repeated flexing.

According to another method of making such rolls, as described in U.S. Pat. No. 3,613,168, a sleeve of such protective material is placed in a cylindrical mold casing concentric with and substantially evenly spaced from the metal core, and the elastomeric material is injected into the space between the core and the sleeve under pressure which causes the sleeve to expand against the inside cylindrical surface of the casing. The elastomeric material is continuously fed into the available area until all of the space has been filled, and in this manner the sleeve is bonded to the elastomeric material and the elastomeric material is simultaneously bonded to the core.

The repeated flexing of the rolls in the normal use of electrostatic copying machines in which such rolls are used, together with the common use of silicone fluid or other substances to prevent offset as described in U.S. Pat. No. 3,435,500, has given rise to a problem due to the fact that silicone fluid is known to have a deleterious effect on silicone rubber which is the elastomeric material commonly used in such rolls. In the process described in U.S. Pat. No. 3,435,500 the end surfaces of the rubber body are protected by ring seals bonded thereto, and the shrinking of the sleeve resulting from use of the heat shrink process of the patent causes both the rubber and the ring seals to be enclosed by the sleeve.

In the process described in U.S. Pat. No. 3,613,168, there is no shrinking of the sleeve. On the contrary, the sleeve is expanded as the rubber is forced into the space between the core and the sleeve. As a consequence, in the finished roll, the end surfaces of the rubber are exposed to the deleterious effect of the silicone fluid.

Efforts to overcome the difficulty by coating the exposed end surfaces of the rubber with a thin coating of fluid flurosilicone which is not affected adversely by silicone fluid have not been entirely successful.

It is an object of the present invention to provide a method of protecting the silicone rubber from the deleterious effects of silicone fluid. It is a further object of the invention to provide support for the end surfaces of the rubber to restrain the tendency of the rubber to spread laterally (i.e. in a direction parallel to the axis of the roll) under the pressure exerted by a heater roll of a copying machine with which the fuser roll is in engagement.

According to the present invention, during the assembly of the mold including the core and the sleeve, an annular ring of rectangular cross-section is placed within the sleeve between the sleeve and the core at each end of the core. The ring fits snugly into the sleeve, and the sleeve protrudes beyond the ring at both ends of the roll. The ring is made of uncured, deformable flurosilicone, preferably so compounded that when cured, its hardness will be somewhat in excess of that of the silicone rubber body when cured. After assembly of the mold, fluid pressure is applied to the space between the core and the sleeve to expand both the sleeve and the sealing rings into contact with the mold walls. For example, the inlet end of the mold may be connected to an extruder and silicone rubber may be injected under pressure into the space between the core and the sleeve through apertures extending through the ring which is at the inlet end of the mold. Entrapped air within the mold is allowed to escape through an aperture through the ring at the other end of the mold. As the silicone rubber is forced in under pressure and as the space between the core and the sleeve becomes filled with rubber, pressure is exerted on the sleeve to expand it into contact with the mold wall. Pressure is also exerted on the rings to deform them by increasing their outside diameters and to simultaneously expand the portions of the sleeve in contact therewith into contact with the mold walls. Simultaneously, of course, the thickness of the rings is decreased somewhat, and a bond is established between the surfaces of the ring and the opposed end surfaces of the silicone rubber and the inside cylindrical surfaces of the sleeve, respectively.

Preferably, the rings are so dimensioned that even after deformation, their thickness will be at least ¼ inch so that the bonded area between the outside cylindrical surface of each ring and the opposed inside surface of the sleeve will have a width of at least ¼ inch. A bonded band of this width not only provides protection against incursion of silicone fluid over extended periods of use of the roll, but also provides support for the ends of the sleeve, particularly when the hardness of the flurosilicone is somewhat greater than that of the silicone rubber. After filling, the mold is placed in an oven and the elastomeric materials of the rings and body are cured at a temperature of approximately 340° F. to 360° F. for a period of 60 to 240 minutes. After curing, the roll is removed from the mold and the protruding ends of the sleeve are trimmed off flush with the exposed end surfaces of the rings. Thereafter, the apertures in the inlet ring through which the rubber was injected, and the aperture in the outlet ring through which the entrapped air escaped, may be filled and sealed with flurosilicone plugs or with fluid flurosilicone which solidifies in the form of plugs which seal the apertures.

Alternatively, instead of expanding the sleeve and rings by the pressure applied by injecting the silicone rubber, the sleeve and rings may be first expanded by air pressure after which the rubber may be injected.

A preferred embodiment of apparatus for carrying out the above described method is shown in the accompanying drawings in which.

Figure 1:
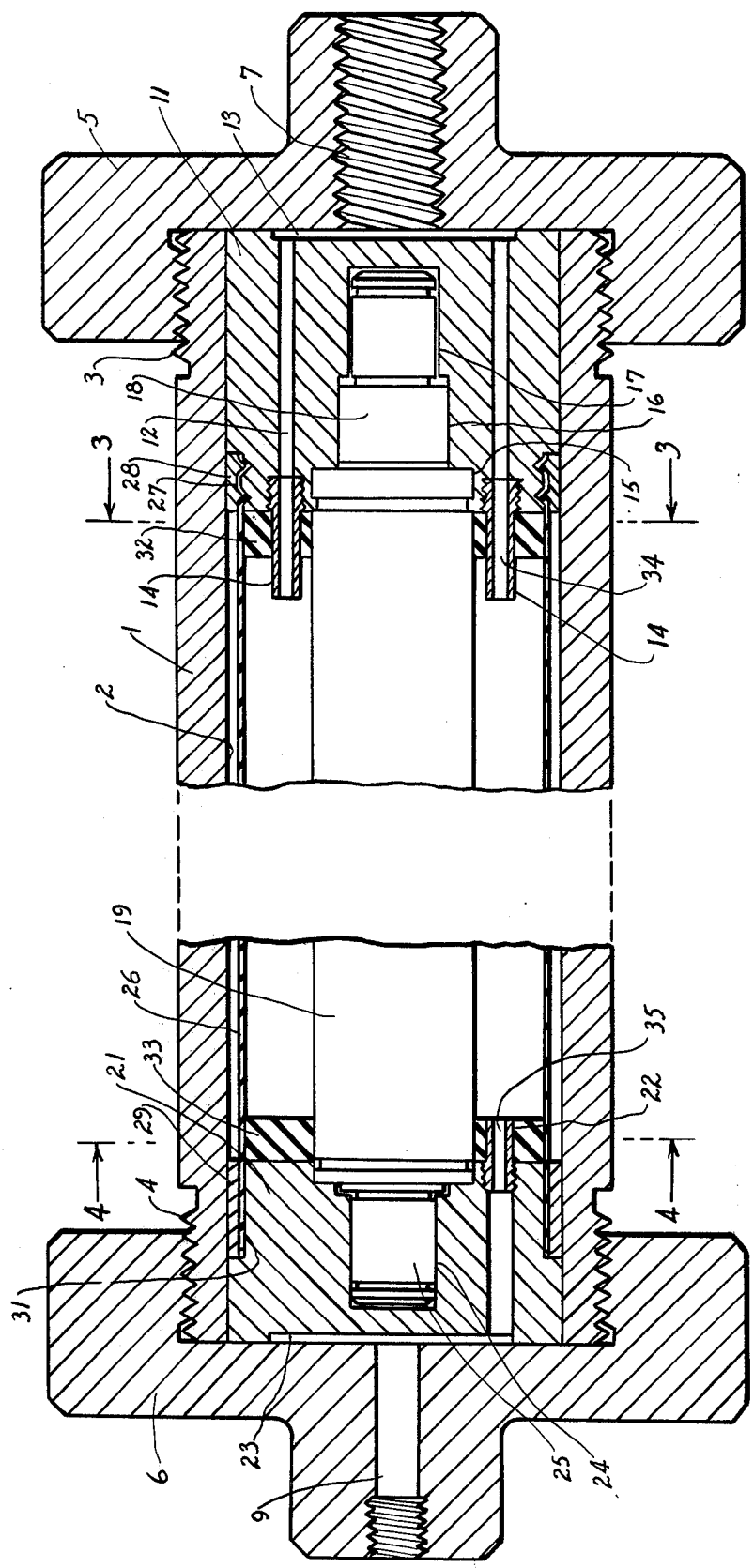
FIG. 1 is a longitudinal section through the assembled mold prior to injection of the silicone rubber.
Figure 3:
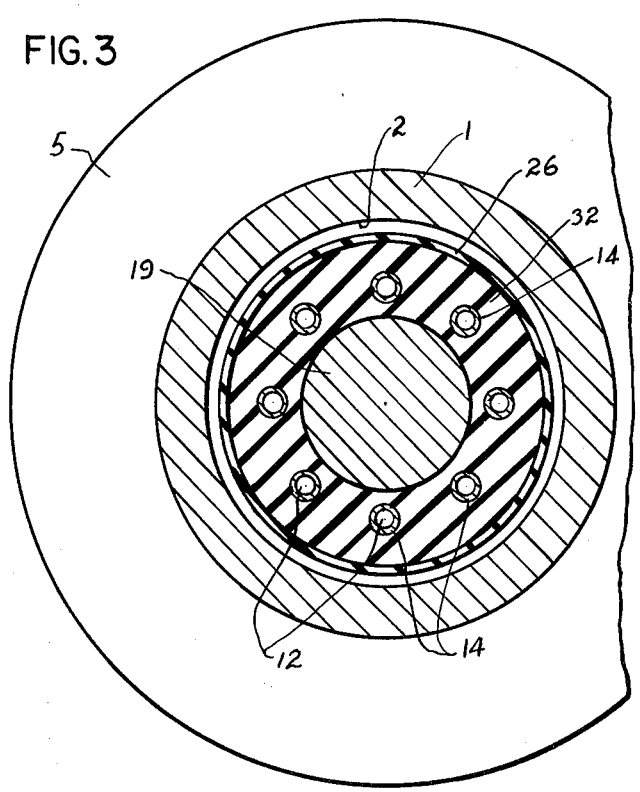
Figure 4:
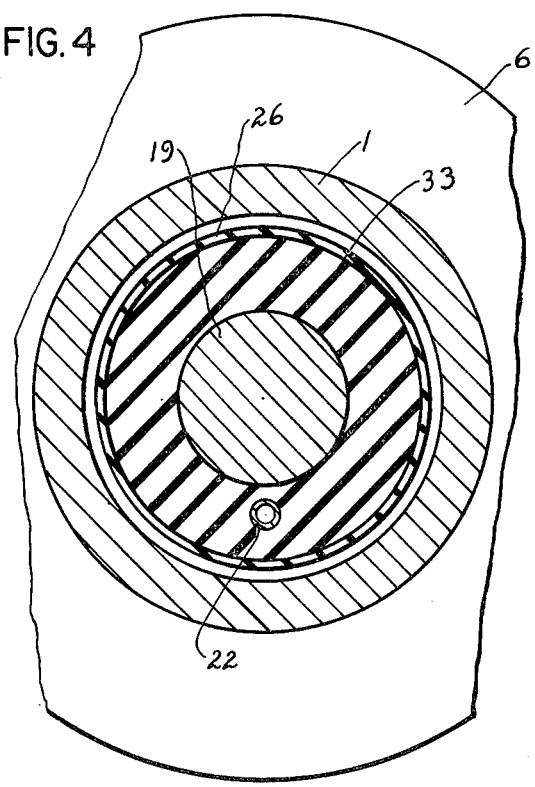

FIGS. 3 and 4 are transverse sections on the lines 3—3 and 4—4 of FIG. 1.

Figure 2:
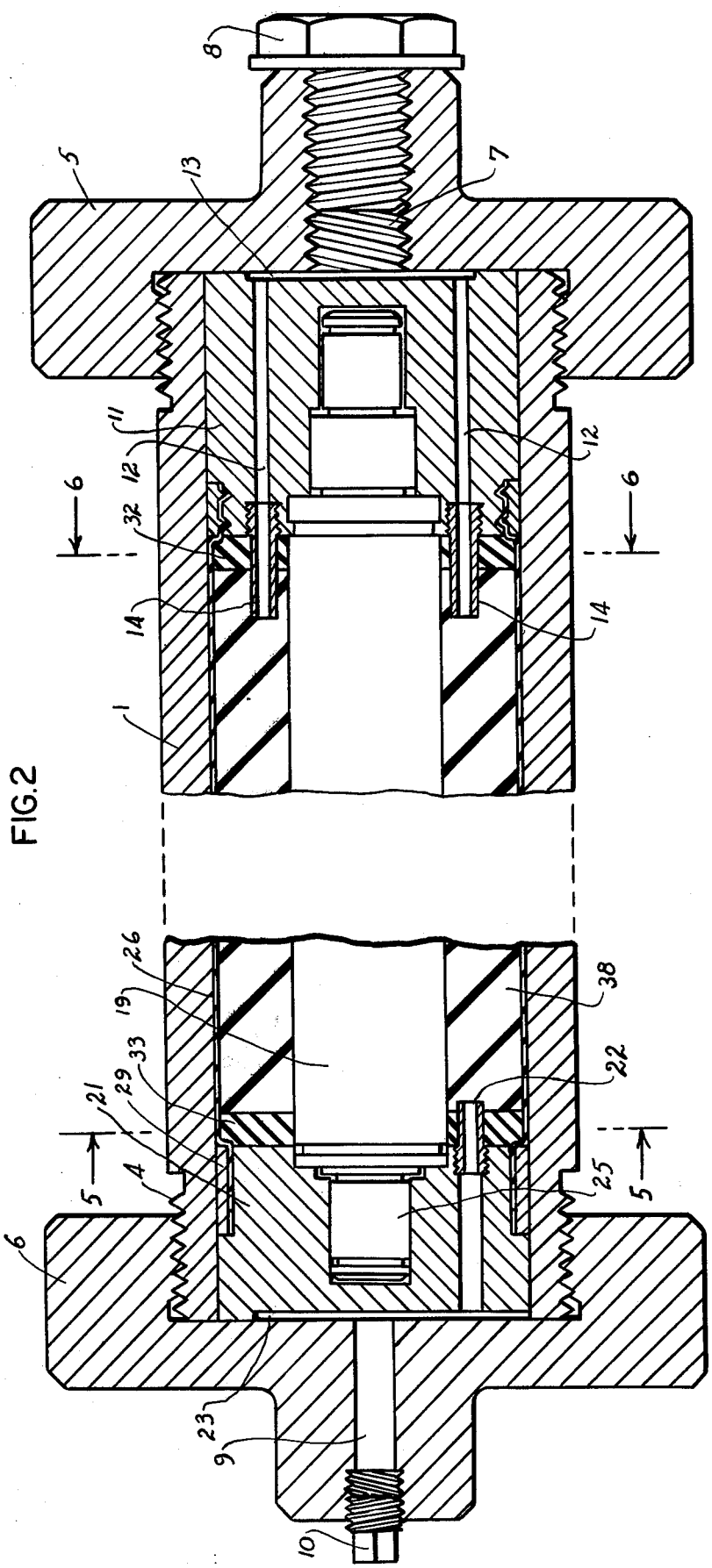
FIG. 2 is a similar section after injection of the rubber has been completed.
Figure 6:
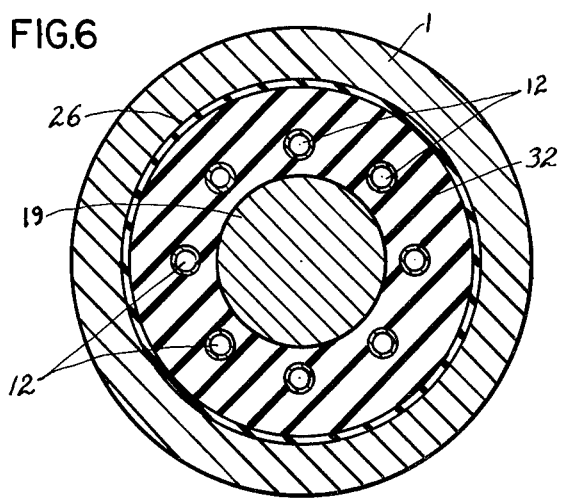
Figure 5:
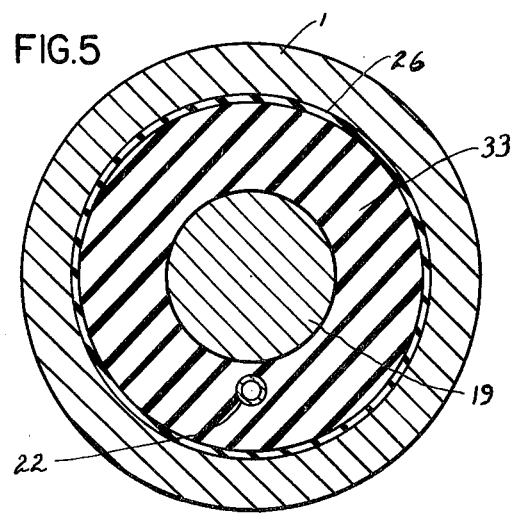

FIGS. 5 and 6 are transverse sections on the lines 5—5 and 6—6 of FIG. 2.

Figure 7:
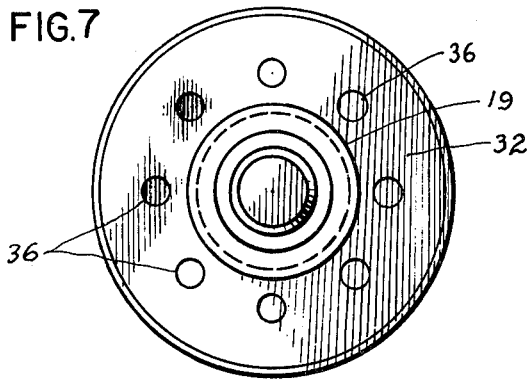
Figure 8:
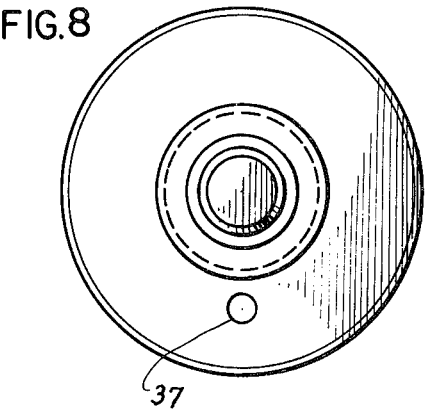

FIGS. 7 and 8 are end views of the ends of the completed roll.

Referring to the drawings, the mold comprises a tubular shell 1 having a smooth cylindrical bore 2 which forms the outer wall of the mold cavity, and having externally threaded ends 3 and 4 to receive threaded end caps 5 and 6, respectively. The end cap 5 at the inlet end of the mold is provided with a threaded passage 7 which may be connected to an extruder. The passage may be closed by a plug 8. The end cap 6 at the outlet end of the mold is provided with a passage 9 through which entrapped air may be expelled. The end of the passage is threaded to receive a threaded plug 10 by which the passage may be closed after the entrapped air has been completely expelled.

A cylindrical member 11, sometimes referred to as a spider, is mounted in the inlet end of the mold fitting snugly therein. A plurality of small diameter cylindrical passages 12 extend through the spider 11 and open into a shallow depression 13 in the end face of the spider. The passage 7 of the cap 5 also opens into the depression so that the silicone rubber which is forced into the mold through passage 7 may be distributed uniformly to each of the passages 12. Each of the passages 12 is fitted with a tubular nozzle 14 through which the rubber is delivered into the interior of the mold.

The spider 11 is provided with a plurality of stepped cylindrical bores 15, 16 and 17 of decreasing diameter to receive, support and center the hub 18 of one end of the cylindrical metal core 19.

A cylindrical member 21, also referred to as a spider, is mounted in the outlet end of the mold, fitting snugly therein. A single nipple 22 having a cylindrical passage therethrough extends through the spider and opens into a shallow depression 23 which communicates with the passage 8 so that the air entrapped within the mold may be expelled. The spider 21 is also provided with a cylindrical bore 24 to receive, support and center the hub 25 of the other end of the core 19.

The sleeve 26, preferably of tetrafluroethylene, is mounted and supported at its ends on the roll and sleeve support spiders 11 and 21. Preferably, the spider 11 is provided with means to lock the sleeve to prevent displacement of the end of the sleeve as the silicone rubber is injected. Thus, the end of the sleeve may be locked as described in U.S. Pat. No. 3,724,983. Alternatively, the inner end of the spider 11 may be provided with a recessed grooved surface 27 which cooperates with a grooved split ring 28 to lock the end of the sleeve to prevent displacement of the end of the sleeve. The inner end of the spider 21 is provided with a collar 29, the inside diameter of which is greater than the outside diameter of the recess 31 in the spider 21 by an amount greater than the wall thickness of the sleeve so that the end of the sleeve may slide freely in the space between the collar and the spider as the sleeve is expanded.

Annular sealing rings 32 and 33 are provided for the ends of the roll. The rings are made of uncured, deformable elastomeric material such as flurosilicone and are preferably so compounded that the hardness of the rings, when cured, will be somewhat harder than that of the cured silicone rubber. For example, if the durometer reading of the cured silicone rubber is approximately 20, a durometer reading of 40 to 60 for the flurosilicone rings will be useful to provide improved support at the ends of the sleeve.

The uncured rings are preformed in annular form and rectangular cross-section with an inside diameter substantially similar to the outside diameter of the core and with an outside diameter substantially similar to the inside diameter of the sleeve so that the cylindrical surfaces of the rings fit snugly against the cylindrical surfaces of the core and sleeve, respectively. The preformed rings for the inlet end of the mold are also provided with a plurality of passages 34 to receive the nozzles 14 which extend therethrough and project outwardly beyond the inner face of the ring when assembled therewith. Likewise, the preformed rings for the outlet end of the mold are provided with a passage 35 to receive the nipple 22. FIG. 1 of the drawings illustrates the assembly of the mold including the sleeve 26 and the preformed rings 32 and 33 ready for application of pressure to expand the sleeve and rings. FIG. 3 illustrates the condition after expansion of the sleeve and rings and after injection of the rubber has been completed. After the filling operation has been completed, the mold is placed in an oven for curing at a temperature of 300° F. to 360° F. for a period of 60 to 360 minutes. Thereafter, the passages 34 and 35 are filled and sealed with flurosilicone plugs 36 and 37, respectively.

As shown in the drawings, the area of contact between the outside cylindrical surfaces of the rings and the inside cylindrical surfaces of the sleeve in the finished rolls is of substantial width, preferably not less than ¼ inch, in order to provide a relatively wide band of bonded contact to prevent incursion of silicone fluid or any other material having a deleterious effect on silicone rubber. In addition, the rings provided improved support for the sleeves at the ends of the roll, particularly when the material of the rings is somewhat harder than the body 38 of silicon rubber.

It will be understood that the invention may be variously modified and embodied within the scope of the subjoined claims.

What is claimed is:

1. The method of sealing the ends of an elastomeric roll having a cylindrical metal core and a flexible outside tubular sleeve of protective material spaced therefrom, which comprises mechanically securing each end of said sleeve to an apertured roll and sleeve support member, each said support member having disposed thereagainst a preformed annular sealing ring to extend between said core and said flexible sleeve, and each said ring being made of deformable curable elastomeric fluorosilicone material, placing said support members, said sleeve and said core within a cylindrical mold having an inside diameter greater than the outside diameter of said sleeve, injecting uncured elastomeric silicone material under pressure through an aperture in said at least one sealing ring and into the space between said sleeve and said core, compressing said sleeve into contact with the cylindrical mold wall and concurrently deforming and expanding said rings and bonding their cylindrical surfaces to opposed cylindrical surfaces of the sleeve and metal core, and thereafter curing said elastomeric materials before removal of the cured sleeved roll from the cylindrical mold.

2. The method of claim 1 in which the last-defined step comprises curing the elastomeric material at a temperature between 300° F. and 360° F. for a period of 60 to 360 minutes.

3. The method of claim 1, additionally including the step of applying compressed gas to said space to inflate said sleeve into mold-wall contact and to expand said rings, and thereafter pressure-injecting said uncured elastomeric material to fill the gas-expanded space.

4. The method of claim 1 in which the sleeve is both expanded and compressed to the mold wall in the course of injecting elastomeric material into said space.

5. The method of claim 4 in which said elastomeric material is injected through plural apertures in one of said rings.

6. The method of making an elastomeric roll which relies upon elastomeric body material around a cylindrical metal core and within a flexible outside tubular sleeve of protective material, said body material being subject to degradation in the presence of a particular hostile environmental material, which method comprises placing an annular sealing ring with at least one eccentrically located through aperture and having cylindrical inside and outside surfaces and exposed outer-end surfaces within each end of said sleeve with the ends of said sleeve protruding beyond the exposed outer-end surfaces of said rings and with the outside cylindrical surfaces of said rings opposed to and in contact with the inside cylindrical surface of said sleeve and the inside cylindrical surfaces of said rings opposed to and in contact with the outside cylindrical surfaces of said core, said rings consisting of deformable, uncured elastomeric material which is specifically resistant to degradation in the presence of said hostile environmental material, placing said sleeve and core within a cylindrical mold having an inside diameter greater than the outside diameter of said sleeve, injecting the elastomeric body material via said through aperture into the space between said sleeve and said core to compress said sleeve into contact with the cylindrical mold wall and concurrently to deform and expand said rings to bond their cylindrical surfaces to the opposed cylindrical surfaces of the sleeve and metal core, respectively, and thereafter curing said elastomeric materials before removal of the cured sleeved roll from the cylindrical mold.

\* \* \* \* \*